United States Patent
Klendworth et al.

(10) Patent No.: US 6,646,072 B2
(45) Date of Patent: Nov. 11, 2003

(54) PROCESS FOR MAKING POLYOLEFIN COMPOSITIONS CONTAINING EXFOLIATED CLAY

(75) Inventors: Douglas D. Klendworth, West Chester, OH (US); Mark K. Reinking, Mason, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 10/055,072

(22) Filed: Jan. 23, 2002

(65) Prior Publication Data

US 2003/0139545 A1 Jul. 24, 2003

(51) Int. Cl.$^7$ .................................. C08F 4/16
(52) U.S. Cl. ................. 526/130; 526/90; 526/158; 526/348; 526/128; 526/156
(58) Field of Search .............. 526/90, 158, 348, 526/128, 130, 156

(56) References Cited

U.S. PATENT DOCUMENTS

| | | | |
|---|---|---|---|
| 4,473,672 A | * 9/1984 | Bottrill | 523/215 |
| 4,483,938 A | 11/1984 | Rees | 502/113 |
| 4,564,647 A | 1/1986 | Hayashi et al. | 523/211 |
| 5,830,820 A | * 11/1998 | Yano et al. | 502/62 |
| 5,906,955 A | 5/1999 | Hamura et al. | 502/103 |
| 5,925,587 A | 7/1999 | Lee et al. | 502/117 |
| 6,034,187 A | * 3/2000 | Machama et al. | 526/72 |
| 6,110,858 A | * 8/2000 | Kaneko et al. | 502/62 |
| 6,252,020 B1 | * 6/2001 | Kuo et al. | 526/128 |
| 6,399,535 B1 | * 6/2002 | Shih et al. | 502/167 |
| 6,465,543 B1 | * 10/2002 | Alexandre et al. | 523/213 |

FOREIGN PATENT DOCUMENTS

| | | | |
|---|---|---|---|
| EP | 0 222 504 | | 10/1986 |
| WO | WO 95/06090 | * | 3/1995 |
| WO | WO 97/00910 | * | 1/1997 |
| WO | WO 01/30864 | | 5/2001 |

OTHER PUBLICATIONS

Bergman et al., *Synthesis And Characterization Of Polyolefin–Silicate Nanocomposites: A Catalyst Intercalation And In Situ Polymerization Approach*, Chem. Commun. (1999), pp 2179–2180.

Izumi, Y. et al., *Zeolite, Clay, and Heteropoly Acid In Organic Reactions*, VCH Publishers Inc. (1992), pp 49–54.

Alexandre et al., *Polyethylene–Layered Silicate Nanocomposites Prepared By The Polymerization–Filling Technique: Synthesis And Mechanical Properties*, Polymer 43 (2002), pp 2123–2132.

Jin et al., *Polyethylene/Clay Nanocomposite By In–Situ Exfoliation Of Montmorillonite During Ziegler–Natta Polymerization Of Ethylene*, Macromol. Rapid Commun. 23, 2002, pp 135–140.

* cited by examiner

Primary Examiner—Ling-Siu Choi
(74) Attorney, Agent, or Firm—John Tyrell; Jonathan L. Schuchardt

(57) ABSTRACT

A clay-filled polyolefin composition and process for making it are disclosed. The process involves treatment of a non-acid-treated smectite clay with a Ziegler-Natta catalyst in the presence of a hydrocarbon and subsequent polymerization of an olefin in the presence of the treated clay and an organoaluminum cocatalyst. Results indicate that filled compositions produced by this process contain exfoliated clay.

17 Claims, No Drawings

PROCESS FOR MAKING POLYOLEFIN COMPOSITIONS CONTAINING EXFOLIATED CLAY

FIELD OF THE INVENTION

The invention relates to a method of exfoliating clay into polyolefins. In particular, the invention relates to treating smectite clay with a Ziegler-Natta catalyst and polymerizing an olefin in the presence of an organoaluminum cocatalyst and the treated clay.

BACKGROUND OF THE INVENTION

Polyolefins are widely used because of their properties. Nevertheless, the applications for polyolefins could be extended if certain properties such as stiffness, strength and heat resistance were improved. While fillers can improve these properties, their use is limited because there does not exist a good method for dispersing the fillers and achieving the desired properties without concomitant loss of toughness. This is presumably due to the high levels of fillers needed and concomitant problems with dispersing the fillers in the polyolefin matrix. There is a need for an improved method to disperse clay filler into a polyolefin matrix.

U.S. Pat. Nos. 5,830,820; 5,906,955; 5,925,587; 6,034,187 and 6,110,858 provide supported catalysts for the polymerization of olefins. Low levels of these supported catalysts are then used to catalyze the polymerization of olefins and provide polyolefins with only low levels of the support material.

U.S. Pat. No. 6,252,020 provides for clay-filled compositions by bulk and suspension polymerization of vinyl monomers such as styrene in the presence of clay and catalysts such as peroxides. Neither the polymerization of olefins such as ethylene or propylene nor the use of transition metals as catalysts is described or suggested.

U.S. Pat. No. 4,473,672 describes a process for making polyolefin compositions with a variety of fillers such as graphite, carbon black, an aluminosilicate clay, mica, talc, vermiculite or glass fibers by pretreating the filler with an organic magnesium compound and then adding the resultant composition to a transition metal and subsequently initiating the polymerization with an organoaluminum compound.

U.S. Pat. No. 4,564,647 teaches a process for producing a filled polyethylene composition with a variety of fillers. The process is general with regard to fillers. Specifically mentioned are metals, metal oxides, metal carbonates, titanium dioxide, mica, glass beads, glass fibers, silica, alumina, silica aluminate and organic pigments among many others. The filler may take various forms, such as powder, granule, flake, foil, fiber and whisker. The catalyst component is a transition metal treated with either a magnesium or manganese compound or is a Group 4 cyclopentadienyl compound. Despite a very broad disclosure, there is no mention of clay and no indication of a method of exfoliating clay.

PCT Int. Appl. WO 01/30864 discloses a method for producing a nanocomposite polymer by use of an acid-treated, cation-exchanging layered silicate material. The reference teaches that the silicate material is acidified by contacting it with a Bronsted acid such as a mineral acid or an amine hydrochloride. This requires an extra step, which increases the cost and complexity of the process. We found that the acid can also a have deleterious effect on the yield of the polymerization process, particularly when a Ziegler-Natta catalyst is used instead of a metallocene complex.

It has been observed that the synthesis of polyolefin-silicate nanocomposites remains a synthetic challenge (Bergman et al., *Chem. Commun.* (1999) 2179). These workers attributed the difficulty to the sensitivity of the vast majority of olefin polymerization catalysts to Lewis bases and water. Therefore, they used late transition metal catalysts to attempt to polymerize ethylene in the presence of a synthetic fluorohectorite. The product formed was described as a rubbery polymer that was highly branched. Such a polymer is unsuitable for many applications because of difficulties in processing.

There is a need for a simple process for providing clay-filled compositions and, in particular, for polyolefin compositions containing exfoliated clay.

SUMMARY OF THE INVENTION

The invention is a process for incorporating clay into polyolefins. The process involves treating smectite clay with a hydrocarbon solution of a Ziegler-Natta catalyst and polymerizing the olefin in the presence of the treated clay and an organoaluminum cocatalyst.

This invention provides for a simple method to prepare polyolefin compositions that contain exfoliated clay platelets. The invention also includes clay-filled polyolefin compositions prepared by this method.

DETAILED DESCRIPTION OF THE INVENTION

The clays useful in the invention are non-acid-treated smectite clays. Smectite clays are well described in the literature (see Izumi, Y. et al., *Zeolite, Clay and Heteropoly Acid in Organic Reactions*, VCH Publishers Inc. (1992)). They are layered materials with exchangeable cations between the layers to compensate for the negative charge of the layers. Clays are classified according to their layer charge. Smectite clay minerals have cation exchange capacity in the range of 60–100 meq/100 g-clay.

Smectite clays can be synthesized from magnesium silicates. Synthetic smectite clays are available from ZEN-NOH UNICO America Corporation. More commonly, they are available from naturally occurring bentonite ore. Two common types of smectite clay are montmorillonite and hectorite. Montmorillonite is classified as magnesium aluminum silicate and hectorite as magnesium silicate. Montmorillonite is more available due to the vast naturally occurring deposits.

By "non-acid-treated," we mean that the clay has not been treated with a Bronsted acid to exchange the cations with a proton. Bronsted acids are acids that can donate a proton. Examples include HCl, $H_2SO_4$, triethylammoniumchloride and N,N-diethylanilinium chloride.

The cations on the clay surface affect the organophilicity of the clay. If the cation is a metallic cation such as sodium or calcium, the clay is not very organophilic and will not dissolve in organic solvents such as toluene. These clays are useful in the invention. However, optionally, it may be preferred to use a more organophilic clay. If the cation is an organic cation such as an ammonium cation, then the clay becomes more organophilic. These are readily prepared by cation exchange of the sodium clay with an organic cation. Suitable organic cations include ammonium cations where the nitrogen has four non-hydrogen substituents, such as hexadecyloctadecyldimethyl ammonium, dimethyldioctadecyl ammonium, benzyl triethyl ammonium, methyltrioctylammonium and poly(oxypropylene)methyldiethyl ammonium. This increases the solubility and ease of dispersion in organic solvents. Dependent upon the amount of cation exchange and the particular organic cation used, the clay may be soluble in organic solvents such as toluene.

Optionally, the clay can be surface treated to react hydroxyl groups on the clay and to increase the organophilicity of the clay. By reacting the hydroxyl groups on the clay, the catalyst performance and hydrogen response is often improved. By "hydrogen response," we mean the ability to incorporate hydrogen as a means of controlling polyolefin molecular weight. The surface treatment can be done with a silicon compound or with a monoalkyl metal compound. Preferably, the surface treatment is done with a silicon compound and preferably the silicon compound is an alkyl disilazane. Suitable alkyl disilazanes include hexaalkyl disilazanes having the formula $R^1_3SiNHSiR^1_3$ where $R^1$ is a $C_1-C_{20}$ hydrocarbyl. In particular, hexamethyldisilazane is preferred. Preferred monoalkyl metal compounds contain a single $C_1$ to $C_8$ alkyl group, as in ethyl aluminum dichloride, isobutyl aluminum dichloride or methyl magnesium chloride.

Optionally, the clay is dried. When the clay has an organic cation or has been treated with an organosilicon compound, it is less hydrophilic and has a tendency to retain less water. For these clays, the drying step is less important. When the clay has a metal cation, it is more hydrophilic and therefore it is preferable to dry the clay. If the clay has a metal cation, preferably the drying is done at a temperature of from about 50° C. to about 600° C., more preferably from about 100° C. to about 400° C. If the clay has an organic cation or has been treated with an organosilicon compound, preferably the drying is done at a temperature of from about 50° C. to about 250° C., more preferably from about 50° C. to about 150° C. All clays are preferably dried with vacuum or with a stream of dry nitrogen.

The clay is treated with a Ziegler-Natta catalyst. By "Ziegler-Natta catalyst," we mean a transition metal compound that incorporates a Group 4–8 transition metal, preferably a Group 4–6 transition metal, and one or more ligands that satisfy the valence of the metal. The ligands are preferably halide, alkoxy, hydroxy, oxo, alkyl, and combinations thereof. Preferred Ziegler-Natta catalysts incorporate Ti, V, or Cr, most preferably Ti. Preferred Ziegler-Natta catalysts also have high thermal stability. They include titanium halides, titanium alkoxides, vanadium halides, and mixtures thereof, especially, $TiCl_3$, $TiCl_4$, mixtures of $VOCl_3$ with $TiCl_4$, and mixtures of $VCl_4$ with $TiCl_4$. Suitable Ziegler-Natta catalysts also include the transition metal compound admixed with various metal halides such as $TiCl_3$ with magnesium chloride or mixtures of $VCl_4$ and $TiCl_4$ with aluminum chloride. Other suitable Ziegler-Natta catalysts appear in U.S. Pat. No. 4,483,938, the teachings of which are incorporated herein by reference, and in Eur. Pat. 222,504.

The catalyst is dispersed, dissolved, or suspended in a compatible organic solvent such as heptane or toluene and added to the clay. The amount of organic solvent can be chosen so that the catalyst solution is just enough to wet the surface of the clay or more solvent can be used to create a slurry or solution of the clay. Optionally, the clay can be predispersed in the organic solvent and then the catalyst or a catalyst solution added. Dependent upon the organophilicity of the clay and the particular solvent chosen, the clay may appear as a damp solid or if sufficiently organophilic may appear to dissolve in the solvent.

When the clay is insoluble, the clay is preferably mixed to ensure good distribution. A convenient way of mixing is to put the treated clay in a bottle on a roll mill.

When a monoalkyl metal is used as a surface treatment, it is preferred to thoroughly mix the clay in an organic solvent prior to adding the monoalkyl metal and the catalyst. This can be done by stirring the clay in the solvent prior to the addition of the monoalkyl metal and the catalyst. The period of time necessary for thorough mixing will vary based upon the shear rate of the stirring.

The treated clay may be used as is with solvent present or optionally the solvent may be removed. If the clay is dissolved in the organic solvent, it is preferable to use the solution as is in the subsequent polymerization. If the clay is insoluble, it is preferable to remove the solvent with vacuum to form a more easily handled solid.

The organoaluminum cocatalyst is an alkyl aluminum or an alkyl aluminum halide. Preferred alkyl aluminums include trialkyl or triaryl aluminum compounds, which preferably have the formula $AlR^5R^6R^7$ where $R^5$, $R^6$ and $R^7$ denote the same or different $C_1-C_{20}$ hydrocarbyl. Particularly preferred alkyl aluminums are trimethylaluminum, triethylaluminum, tripropylaluminum, and triisobutylaluminum. Suitable alkyl aluminum halides include dialkyl aluminum halide and alkyl aluminum dihalide compounds, which preferably have the formula $AlR^5R^6X$ or $AlR^5X_2$ where X is Cl, Br, or I.

Exemplary alkyl aluminum halides are dimethylaluminum chloride, methylaluminum dichloride, diethylaluminum chloride, ethylaluminum dichloride, diisobutylaluminum chloride, isobutylaluminum dichloride, methylaluminum sesquichloride, ethylaluminum sesquichloride, and isobutylaluminum sesquichloride.

Optionally, silicon compounds may be used in the polymerization. These can offer certain improvements such as an improved sensitivity to hydrogen as a means of controlling molecular weight. Preferred silicon compounds are dialkyl dialkoxysilanes which have the formula $R^1R^2Si(OR^3)(OR^4)$ where $R^1$, $R^2$, $R^3$, and $R^4$ denote the same or different $C_1-C_{20}$ hydrocarbyl. Exemplary dialkyl dialkoxysilanes are cyclohexylmethyldimethoxysilane, dimethyldimethoxysilane, dimethyldiethoxysilane and dicyclopentyldimethoxysilane.

Suitable olefins for the polymerization are $C_2-C_{20}$ α-olefins, such as ethylene, propylene, 1-butene, 1-hexene, 1-octene and mixtures thereof. Preferred olefins are ethylene, propylene and mixtures thereof with α-olefins such as 1-butene, 1-hexene and 1-octene.

The treated clays can be used in a variety of well-known olefin-polymerization processes, including gas, high pressure liquid, slurry, solution, or suspension-phase techniques and combinations of these. The pressures used typically range from about 15 psig to about 15,000 psig. Polymerization temperatures range from about −100° C. to about 300° C., more preferably from about 20° C. to about 200° C., and most preferably from about 60° C. to about 150° C.

The clay imparts improved properties such as stiffness and barrier properties including a decreased rate of moisture vapor transmission. In the process of the invention, the clay becomes exfoliated, thereby improving the dispersion of the clay and enabling the improved properties without severe loss of other properties such as impact or toughness. Smectite clay has a multilayer structure. By "exfoliation," we mean breaking the layered structure to improve the dispersion of the clay in the polyolefin. By analogy with a deck of playing cards, non-exfoliated playing cards would be present as groups of 52 stacked playing cards, while exfoliated playing cards would be more dispersed and principally present in groups of substantially fewer than 52 with some cards even being dispersed as single cards. The greater the exfoliation, the better the dispersion and the more effective a certain level of clay at improving the desired properties.

Dependent upon the application, the level of clay in the polymer can be varied. Preferably, the clay will be present at about 0.1% to about 15% by weight. More preferably, the clay will be present at about 1% to about 10% by weight, and most preferably at about 4% to about 6% by weight.

The following examples merely illustrate the invention. Those skilled in the art will recognize many variations that are within the spirit of the invention and scope of the claims.

EXAMPLE 1

Preparation of Treated Clay

Ten grams of montmorillonite clay with sodium cation was dried at 150° C. in a nitrogen stream and then treated with 4 mL of a solution of 0.8 mL of $TiCl_4$ in 100 mL of heptane. The treated clay was rolled for two hours and then vacuum dried.

EXAMPLE 2

Ethylene Polymerization

A polymerization reactor was pressure purged with dry nitrogen three times at 100° C. After completely venting the reactor, 1.5 mL of a 1.6 M solution of triethylaluminum and 800 mL of isobutane were charged to the reactor. To the reactor was added 0.74 grams of the treated clay from Example 1 and 200 mL of isobutane. Hydrogen (100 delta psig on a 300 mL vessel) was added to the reactor. The reactor was pressurized to 550 psig with ethylene and heated to 80° C. The pressure was maintained at 550 psig by addition of ethylene and the polymerization allowed to continue for 2 hours to obtain 4.8 grams of polymer composite containing 15% clay. X-ray diffractograms of the polymer powder and the absence of fines indicate that the clay was finely dispersed in the polymer matrix.

EXAMPLE 3

Preparation of Treated Clay

Ten grams of montmorillonite clay with sodium was dried at 300° C. in a nitrogen stream and then treated with 8 mL of a solution of 0.8 mL of $TiCl_4$ in 100 mL of heptane. The treated clay was rolled for two hours and then vacuum dried.

EXAMPLE 4

Ethylene Polymerization

In similar fashion as in Example 2, a polymerization reactor was charged with 1.5 mL of a 1.6 M solution of triethylaluminum, 1.0 mL of 0.1 M cyclohexylmethyldimethoxysilane and 800 mL of isobutane. To the reactor was added 0.74 grams of the treated clay from Example 3 and 200 mL of ethylene. Hydrogen (100 delta psig on a 300 mL vessel) was added to the reactor. The reactor was heated to 80° C. and the polymerization allowed to continue for 2 hours to obtain 23.8 grams of polymer composite containing 3.1% clay. X-ray diffractograms of the polymer powder and the absence of fines indicate that the clay was finely dispersed in the polymer matrix.

EXAMPLE 5

Preparation of Treated Clay

In a dry-box, 2.0 grams of Claytone HY (montmorillonite clay with ammonium cation from Southern Clay Products Inc., Gonzales, Tex.) was placed in a bottle with a stir-bar. Dry toluene (40.0 mL) was added and the slurry was mixed with a magnetic stir plate until all of the clay solids appeared to dissolve (about one hour). 1,1,1,3,3,3-hexamethyldisilazane (HMDS) was added at the loading of 0.14 grams per gram of Claytone. $TiCl_4$ was added as a 1.0 M heptane solution at the loading of 1.00 millimole Ti per gram of clay.

EXAMPLE 6

Ethylene Polymerization

A one-gallon autoclave reactor was pressure purged with dry nitrogen three times at 100° C. After completely venting the reactor, hydrogen was added as a 100-psi pressure drop from a 300-mL vessel. 1100 mL of isobutane was added to the reactor and the stirring was started. Triethyl aluminum (1.92 mL of 1.56 M solution in heptane) was added to the reactor with a flush of 200 mL of isobutane. Ethylene was added to the reactor to reach 410 psi, and 21.0 mL of catalyst solution from Example 5 (1.00 grams of clay) was added to the reactor with a flush of 200 mL of isobutane. Ethylene was fed into the reactor to maintain 450 psi. After one hour the reactor was vented and the polymer was collected and dried to yield 10.15 grams of polymer. A sample of this polymer was pressed into a plaque and cryogenically sliced. Transmission Electron Microscopy (TEM) showed the clay to be exfoliated.

EXAMPLE 7

Treated Clay

In a dry-box, 2.0 grams of Claytone HY was placed in a bottle with a stir-bar. Dry toluene (40.0 mL) was added and the slurry was mixed with a magnetic stir plate until all of the clay solids appeared to dissolve (about one hour). $TiCl_4$ was added as a 1.0 M heptane solution at the loading of 1.00 millimole Ti per gram of clay.

EXAMPLE 8

Ethylene Polymerization

The polymerization procedure of Example 6 was repeated using 21.0 mL of catalyst solution from Example 7 (1.00 grams of clay). The polymerization was conducted for two hours to yield 26.18 grams of polymer. TEM showed exfoliation of the clay.

EXAMPLE 9

Treated Clay

In a dry-box, 2.0 grams of Claytone HY was placed in a bottle with a stir-bar. Dry toluene (40.0 mL) was added and the slurry was mixed with a magnetic stir plate for about an hour until all of the clay solids appeared to dissolve. Ethylaluminumdichloride was added at the loading of 1.00 millimole Al per gram of Claytone. $TiCl_4$ was added as a 1.0 M heptane solution at the loading of 1.00 millimole Ti per gram of clay.

EXAMPLE 10

Ethylene Polymerization

The polymerization procedure of Example 6 was repeated using 21.6 mL of catalyst solution from Example 9 (1.00 grams of clay). The polymerization was conducted for twenty-two minutes to yield 55.38 grams of polymer. TEM showed little to no exfoliation of the clay.

EXAMPLE 11

Treated Clay

The conditions of Example 9 were repeated on a larger scale and using a longer mixing time. Fifteen grams of Claytone HY were placed in a three-neck flask fitted with an overhead paddle stirrer. The flask was connected to an oil bubbler and the flask was purged with nitrogen for three days. Dry toluene (400 mL) was added and the clay was mixed into the toluene until the clay solids appeared to dissolve. After four hours of mixing, ethylaluminumdichloride was added at the loading of 1.00 millimole Al per gram of clay. $TiCl_4$ was added as a 1.0 M heptane solution at the loading of 1.00 millimole Ti per gram of clay.

EXAMPLE 12

Ethylene Polymerization

The polymerization procedure of Example 6 was repeated using 7.0 mL of 1.56 M triethylaluminum and all of catalyst solution from Example 11 (15.0 grams of clay). The polymerization was conducted for seven hours to yield 93.08 grams of polymer. TEM showed some exfoliation of the clay.

EXAMPLE 13

Treated Clay

In a dry-box, 2.0 grams of synthetic smectite clay containing methyltrioctylammonium cation (Lucentite STN available from Co-Op Chemical Co., LTD. Tokyo, Japan) was placed in a bottle with a stir-bar. Dry toluene (60.0 mL) was added and the slurry was mixed for 48 hours with a magnetic stir plate. 1,1,1,3,3,3-hexamethyldisilazane (HMDS) was added at the loading of 0.14 grams per gram of clay. $TiCl_4$ was added as a 1.0 M heptane solution at the loading of 1.00 millimole Ti per gram of clay.

EXAMPLE 14

Ethylene Polymerization

The polymerization procedure of Example 6 was repeated using 31.0 mL of catalyst solution from Example 13 (1.0 grams of clay). The polymerization was conducted for 171 minutes to yield 35.52 grams of polymer. TEM showed exfoliation of the clay.

EXAMPLE 15

Treated Clay

In a dry-box, 2.0 grams of Lucentite STN clay was placed in a bottle with a stir-bar. Dry toluene (60.0 mL) was added and the slurry was mixed for 48 hours with a magnetic stir plate. $TiCl_4$ was added as a 1.0 M heptane solution at the loading of 1.00 millimole Ti per gram of clay.

EXAMPLE 16

Ethylene Polymerization

The polymerization procedure of Example 6 was repeated using 31.0 mL of catalyst solution from Example 15 (1.0 grams of clay). The polymerization was conducted for 35 minutes to yield 34.76 grams of polymer. TEM showed exfoliation of the clay.

EXAMPLE 17

Treated Clay

In a dry-box, 2.0 grams of Lucentite STN clay was placed in a bottle with a stir-bar. Dry toluene (60.0 mL) was added and the slurry was mixed for 48 hours with a magnetic stir plate. Ethylaluminumdichloride was added at the loading of 1.00 millimole Al per gram of clay. $TiCl_4$ was added as a 1.0 M heptane solution at the loading of 1.00 millimole Ti per gram of clay.

EXAMPLE 18

Ethylene Polymerization

The polymerization procedure of Example 6 was repeated using 31.0 mL of catalyst solution from Example 17 (1.0 grams of clay). The polymerization was conducted for five hours to yield 9.52 grams of polymer. TEM showed exfoliation of the clay. (Compared to previous preparations with shorter mixing times, this sample shows more exfoliation.)

EXAMPLE 19

Treated Clay

The treatment procedure of Example 15 was repeated on a larger scale and using a lower loading of $TiCl_4$. Twenty-five grams of Lucentite STN were dissolved in 600 mL of dry toluene and were stirred for 48 hours using a magnetic stir bar. Eighty mL of this clay solution was treated with 2.0 mL of a 1.00 M $TiCl_4$ solution for a loading of 0.60 millimole Ti per gram of clay.

EXAMPLE 20

Ethylene Polymerization

The polymerization procedure of Example 6 described above was repeated using 3.84 mL of 1.56 M triethylaluminum and all of catalyst solution (3.33 grams of clay) of Example 19. The polymerization was conducted for one hour to yield 70.33 grams of polymer. TEM showed exfoliation of the clay.

COMPARATIVE EXAMPLES 21–26

These examples show the deleterious impact of pretreating the clay with an acid prior to combining the clay with a Ziegler-Natta catalyst.

COMPARATIVE EXAMPLE 21

Clay Pretreated with Acid

Ten grams of montmorillonite clay with sodium cation (as used in Example 1) was placed in a 250-mL flask and 100 mL of a 1.0 M HCl solution was added. After stirring for one hour at room temperature, the contents of the flask were filtered, reslurried in 20 to 25 mL of a 0.5 M solution of HCl and filtered again. The clay was slurried in 0.5 M HCl a second time, filtered and then washed twice with 20–30 mL of deionized water. Water was removed from the clay by drying in a flowing nitrogen atmosphere overnight at a 150° C. The resultant acid-treated clay was then treated as in Example 1 with 4 mL of a solution of 0.8 mL of $TiCl_4$ in 100 mL of heptane. The treated clay was rolled for two hours and then vacuum dried.

COMPARATIVE EXAMPLE 22

Polymerization Using Clay Pretreated with Acid

The polymerization process of Example 2 was generally followed, except that the clay pretreated with acid from Comparative Example 21 was used in place of the clay from Example 1. No measurable polymer was obtained.

COMPARATIVE EXAMPLE 23

Polymerization Using Clay Pretreated with Acid

The polymerization process of Example 22 was generally followed, except that 1.5 mL of 0.1 M cyclohexylmethyldimethoxysilane was also added to the polymerization reaction. Again, no measurable polymer was obtained.

COMPARATIVE EXAMPLE 24

Clay Pretreated with Acid

The procedure of Comparative Example 21 was repeated except that sulfuric acid was used in place of hydrochloric acid.

COMPARATIVE EXAMPLE 25

Polymerization Using Clay Pretreated with Acid

The polymerization process of Example 2 was generally followed, except that the clay pretreated with acid from Comparative Example 24 was used in place of the clay from Example 1. No measurable polymer was obtained.

COMPARATIVE EXAMPLE 26

Polymerization Using Clay Pretreated with Acid

The polymerization process of Example 25 was generally followed, except that 1.5 mL of 0.1 M cyclohexylmethyldimethoxysilane was also added to the polymerization reaction. Again, no measurable polymer was obtained.

The preceding examples are meant only as illustrations. The following claims define the invention.

We claim:

1. A process for the preparation of exfoliated clay-filled polyolefins which comprises:
   (a) treating a non-acid-treated smectite clay with a Ziegler-Natta catalyst in the presence of a hydrocarbon; and
   (b) polymerizing an olefin in the presence of the treated clay and an organoaluminum cocatalyst wherein the organoaluminum cocatalyst is selected from the group consisting of trialkyl aluminums, triaryl aluminums, alkyl aluminum halides, alkyl aluminum dihalides, and mixtures thereof.

2. The process of claim 1 wherein the Ziegler-Natta catalyst incorporates a Group 4–6 transition metal.

3. The process of claim 2 wherein the transition metal is selected from the group consisting of titanium, vanadium, and chromium.

4. The process of claim 1 wherein the organoaluminum cocatalyst is a trialkyl aluminum compound.

5. The process of claim 1 wherein the smectite clay has no surface pretreatment.

6. The process of claim 1 wherein the smectite clay has been surface treated prior to treatment with the Ziegler-Natta catalyst.

7. The process of claim 6 wherein the smectite clay is surface treated with a silicon containing compound or with a monoalkyl metal compound.

8. The process of claim 7 wherein the smectite clay is surface treated with an alkyl disilazane.

9. The process of claim 1 wherein the smectite clay contains an organic cation.

10. The process of claim 9 wherein the smectite clay contains an ammonium cation where the nitrogen has four non-hydrogen substituents.

11. The process of claim 1 wherein the smectite clay contains a metal cation.

12. The process of claim 11 wherein the metal cation is sodium.

13. The process of claim 1 wherein the smectite clay is dried prior to treatment with the Ziegler-Natta catalyst.

14. The process of claim 1 wherein the smectite clay is stirred in a hydrocarbon solution for more than 1 hour prior to treatment with the Ziegler-Natta catalyst.

15. The process of claim 1 wherein the smectite clay is used at a level of from about 0.1% to about 15% by weight based on the amount of polyolefin.

16. The process of claim 15 wherein the smectite clay is used at a level of from about 1% to about 10% by weight based on the amount of polyolefin.

17. The process of claim 16 wherein the smectite clay is used at a level of from about 4% to about 6% by weight based on the amount of polyolefin.

* * * * *